Oct. 4, 1966

L. J. HEATON-ARMSTRONG   3,277,378

AUTOMATIC ELECTRICAL CONTROL SYSTEM HAVING PLURAL COMPARATORS
AND AUTOMATIC DISABLING OF COARSE COMPARATOR

Filed July 18, 1963

2 Sheets-Sheet 1

Inventor
LOUIS JOHN HEATON-ARMSTRONG

By
Attorney

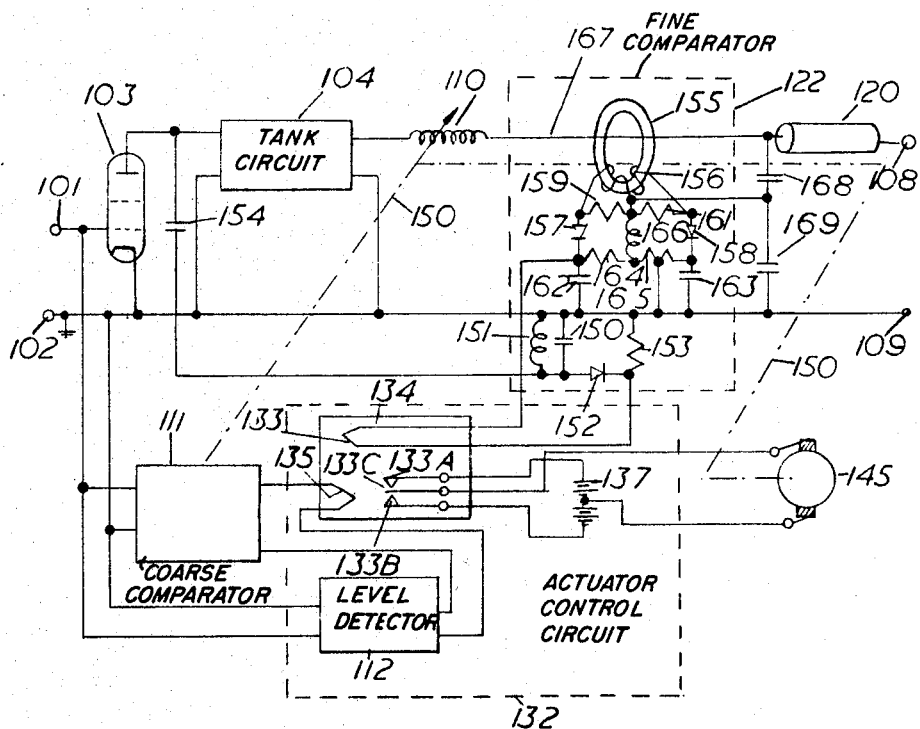

United States Patent Office 3,277,378
Patented Oct. 4, 1966

3,277,378
AUTOMATIC ELECTRICAL CONTROL SYSTEM HAVING PLURAL COMPARATORS AND AUTOMATIC DISABLING OF COARSE COMPARATOR
Louis John Heaton-Armstrong, London, England, assignor to International Standard Electric Corporation, New York, N.Y., a corporation of Delaware
Filed July 18, 1963, Ser. No. 295,898
Claims priority, application Great Britain, Aug. 17, 1962, 31,657/62
9 Claims. (Cl. 325—187)

This invention relates to electrical control arrangements in which a parameter of a variable element is controlled by a parameter of an input signal applied to the arrangement.

According to the invention there is provided an electrical control arrangement including an actuator coupled to a controlled element, a path to feed a first input signal to a coarse comparator, a path to feed a second input signal to a fine comparator, a first feedback path from the controlled element to the coarse comparator to produce a first error signal having a level dependent upon the difference between the value of a parameter of the controlled element and a predetermined value related to the value of a parameter of the first input signal, a second feedback path from the controlled element to the fine comparator to produce a second error signal having a level dependent upon the difference between the parameter of the controlled element and the said predetermined value and an actuator control circuit including a level detector and a switching device whereby, the operation of the actuator is controlled by either the first error signal, when the level thereof exceeds a particular value, or by the second error signal when the level thereof is below the particular value.

Figure 1:
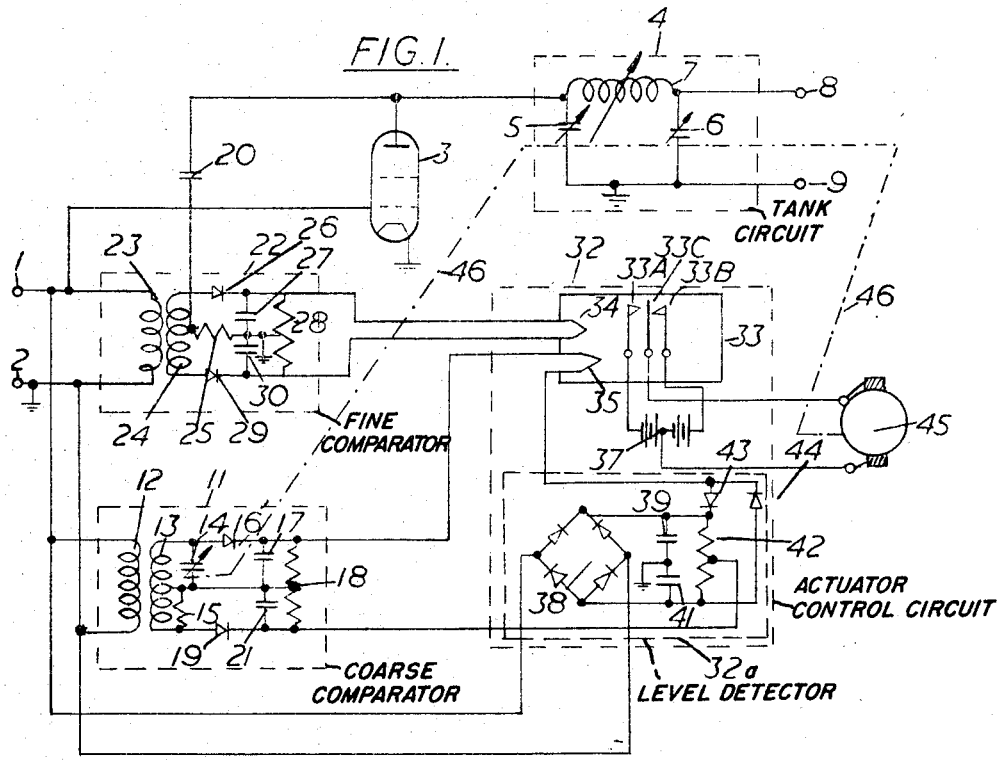
Figure 2:
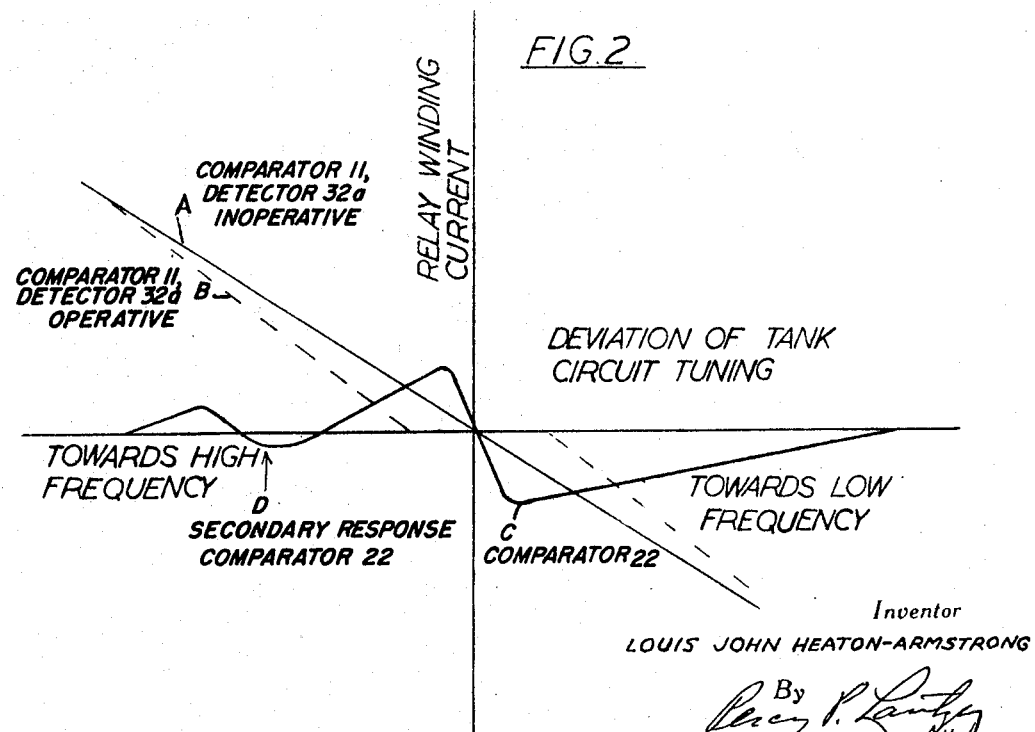

Two embodiments of the invention for use in radio transmitters will now be described with reference to the accompanying drawings in which:

FIG. 1 shows a circuit diagram of a first embodiment of the invention in an automatic tuning arrangement for a radio transmitter, FIG. 2 shows the characteristics of a coarse comparator and fine comparator used in the first embodiment of the invention and, FIG. 3 shows a circuit diagram of a second embodiment of the invention in an automatic aerial loading arrangement for a radio transmitter.

Referring to FIG. 1 there is shown a circuit including a transmitter output valve 3, a tank circuit 4, comparators 11 and 22, an actuator control circuit 32 and a motor 45. The tank circuit 4 comprises variable capacitors 5 and 6 and the variable inductor 7. An aerial (not shown) is connected across the tank circuit 4 at terminals 8 and 9. An input drive signal to the control grid of tube 3 is applied across terminals 1 and 2. The D.C. supply connections to tube 3 are not shown.

The comparator 11 consists of a primary winding 12 connected to input terminals 1 and 2, a center-tapped secondary winding 13 inductively coupled to the winding 12, a variable capacitor 14 and a resistor 15 each connected across opposite halves of the secondary winding 13. The comparator 11 includes a rectifying circuit connected across one half of the winding 13 and comprising a rectifier 16, a storage capacitor 17 and one half of a center-tapped load resistor 18, and another rectifying circuit connected across the other half of the secondary winding 13 comprising a rectifier 19, a storage capacitor 21 and the other half of resistor 18.

The comparator 22 includes a primary winding 23 connected to input terminals 1 and 2 and inductively coupled to the winding 24, and a load resistor 25 connected between the center tap of the winding 24 and ground. The comparator 22 also includes a rectifying circuit connected across one half of the winding 24 and comprising a rectifier 26, a reservoir capacitor 27 and one half of a center tapped load resistor 28, and another rectifying circuit connected across the other half of the winding 24 and comprising a rectifier 29, a reservoir capacitor 30 and the other half of resistor 28.

The actuator control circuit 32 includes a relay 33, a D.C. supply 37, and a circuit which operates as an error signal level detector.

The relay 33, such as a polar relay, has two field windings 34 and 35, two fixed contacts 33A and 33B and a moving contact 33C. The contacts 33A and 33B are connected across the terminals of D.C. supply 37. The armature of motor 45 is connected between moving contact 33C and the center-point of D.C. supply 37.

The rectifier bridge 38 in conjuction with the reservoir capacitors 39 and 41 and the center-tapped resistor 42 forms a bias supply circuit the input of which is coupled to terminals 1 and 2 and the input of comparator 11.

One side of the relay winding 35 is connected via rectifier 43 to one terminal of resistor 42 and via rectifier 44 to the opposite terminal of resistor 42.

The bias voltage supply and rectifiers 43 and 44 form a level detector which operates on the first error signal.

The motor 45 is coupled by a mechanical coupling 46 to variable capacitors 5 and 6 and variable inductor 7, which are ganged, and to variable capacitor 14 in comparator 11.

A capacitor 20 is connected between the anode of tube 3 and the center-tap of the winding 24. The winding 34 of relay 33 is connected across resistor 28, and winding 35 is connected between one terminal of resistor 18 and the junction of rectifiers 43 and 44.

The purpose of this embodiment of the invention is to automatically tune tank circuit 4 to the frequency of the input signal applied to the control grid of transmitter output tube 3 so that the signal voltages at the anode and grid are 180° out of phase. The tuning capacitors 5 and 6, and the tuning inductor 7 are thus elements whose capacitance and inductance, respectively, are controlled by the frequency of the input signal. The comparator 11 constitutes a "coarse" comparator and the comparator 22 a "fine" comparator. The term "comparator" as used throughout this specification refers to an arrangement for determining the relationship between the magnitude of a parameter of an input signal and the magnitude of the variable parameter to be controlled, and for providing an error signal from the output of the comparator in response to this relationship. When the relationship between the parameter of the input signal and the variable parameter is the required relationship the output signal from the comparator is zero, and when the relationship deviates from that required an error signal will be produced.

In this specification the term "coarse comparator" refers to a comparator which provides an error signal when the value of the parameter of the controlled element differs from a predetermined value by more than a given amount.

The term "fine comparator" refers to a comparator which provides an error signal when the value of parameter of the controlled element differs from the said predetermined value by less than the given amount.

The comparator 11 is a frequency discriminator whose frequency response is varied by means of capacitor 14, which is itself determined by the setting of tuning capacitors 5 and 6 and tuning inductor 7 of tank circuit 4. The input signal applied across terminals 1 and 2 is also applied to the primary winding 12 of comparator 11 and if the setting of the tank circuit tuning components is incorrect with respect to the frequency of the input signal, the setting of variable capacitor 14 will be such as to produce an error signal from comparator 11 which when applied to winding 35 of relay 33 will operate motor 45 in such a way as to readjust tank circuit tuning capacitors 5 and 6 and inductor 7 thus tending to tune tank circuit 4 to the input signal frequency. The frequency response of the discriminator could, of course, be varied by variation of an inductor instead of capacitor 14.

Referring to FIG. 2 the full line A shows the frequency response characteristic of the course comparator 11 which would be obtained if level detector 32a were inoperative. Due, however, to the operation of level detector 32a, a reverse bias is applied to each of rectifiers 43 and 44, which are connected in series between the output of comparator 11 and winding 35 of relay 33. The magnitude of the reverse bias is directly dependent upon the magnitude of the input signal at terminals 1 and 2. When the voltage across load resistor 18 is insufficient to overcome this reverse bias, no current will flow in winding 35 and comparator 11 will be rendered inoperative so far as control system 32 is concerned. This condition arises when the setting of the tuning components of tank circuit 4 is approximately correct. When the input signal amplitude is liable to vary it is advantageous to derive the reverse bias from a voltage source which varies in accordance with the magnitude of the input signal at terminals 1 and 2 so that the error signal from the fine comparator controls the operation of the actuator when the setting of the tuning components is in error by less than the fixed amount. If the input signal amplitude is always constant then the reverse bias could equally well be obtained from a source of fixed voltage. The actual frequency response of comparator 11 is represented by dotted line B.

When the setting of the tuning components of the tank circuit 4 is in error by less than the predetermined amount the error signal from fine comparator 22 takes control of relay 33 as it is larger than that from coarse comparator 11. The comparator 22 is a phase discriminator which compares the phase of the input signal applied to the control grid of tube 3 with the phase of the amplified signal at the anode. The input signal is applied to winding 23 and a portion of the signal voltage at the anode of tube 3 is applied to the center tap of winding 24. When the phase of the signals at the anode and control grid of tube 3 differs by 180°, which corresponds to the required tuning point of tank circuit 4, the output voltage from comparator 22 is zero and therefore the current flowing through winding 34 is zero.

The frequency response of comparator 22 is represented by line C, FIG. 2 which shows that the two comparators have response curves with coincident cross-over points. In practice the cross-over points of the two comparators correspond to different settings of the tank circuit components, owing to variations in the impedance of the aerial circuit connected across the output of tank circuit 4. It is for this reason that coarse comparator 11 must be rendered inoperative while fine comparator 22 finally adjusts the tuning point of the tank circuit to the correct setting.

The operation of relay 33 is controlled by the magnitude and direction of the larger of the currents flowing in the windings 34 and 35, each of which have the same number to turns. When coarse comparator 11 is rendered inoperative the operation of the relay is controlled by the current flowing in winding 34 alone. Referring to FIG. 2 a secondary response of the fine comparator occurs as shown at D, when tank circuit 4 is tuned to the second harmonic of the input signal frequency. It is necessary to ensure that the current in winding 35 from coarse discriminator 11 is always sufficiently large to over-rule the effect of the current in winding 34 from fine comparator 22 when tank circuit 4 is tuned to a harmonic of the input signal frequency. This will prevent the fine comparator from gaining control of tuning motor 45 and mistuning tank circuit 4. The use of a coarse comparator to position the tuning components of tank circuit 4 approximately correct in relation to the input signal is necessary because of these spurious responses in the fine comparator response characteristic. The windings 34 and 35 of the relay 33 need not have the same number of turns, provided that the magnitudes of the respective output currents from the comparators are adjusted accordingly.

The direction of the predominant current in windings 34 and 35 will determine which of fixed contacts 33A or 33B of relay 33 will make contact with moving contact 33C, and control the direction of the E.M.F. applied to motor 45 from D.C. supply 37 and hence the direction of the adjustment of the tuning components of tank circuit 4 and variable capacitor 14. When the windings of relay 33 are not energized, moving contact 33C, is disconnected from both the fixed contacts and no E.M.F. is applied to the motor. The ganging between the coarse and fine comparators is made sufficiently accurate in this embodiment of the invention by arranging that the tuning components of tank circuit 4 and variable capacitor 14 each vary with rotation of mechanical coupling 46 according to approximately the same level. The accuracy of ganging between the coarse and fine comparators is in any case limited by the variations in the aerial impedance as previously mentioned. The tank circuit 4 is not restricted to the configuration used in the embodiment.

The mechanical coupling 46 between the tuning components of tank circuit 4 and variable capacitor 14 in coarse comparator 11 constitutes a feedback path between the variable parameters of tank circuit 4 and coarse comparator 11. The torque applied to the rotor of capacitor 14 by coupling 46 represents the feedback signal. Similarly the signal path between the anode of tube 3 and fine comparator 22 via capacitor 20 constitutes a feedback signal path between the variable parameters of tank circuit 4 and fine comparator 22. The portion of the anode signal voltage fed to the center tap of winding 24 represents the feedback signal.

The relative adjustment direction of capacitor 14 of comparator 11 with respect to the adjustment of the tuning of tank circuit 4 will now be described. Comparator 11 includes a series RC network including capacitor 14 and resistor 15. Capacitor 14 is not resonant with secondary 13 but rather along with resistor 15 has a frequency characteristic related to the voltage developed across the capacitor and resistor which is determined by the frequency characteristics obtained across the respective capacitor and resistor elements of the RC network. It should be pointed out that comparator 11 gives a zero D.C. output current when the voltage across variable capacitor 14 is equal to the voltage across resistor 15. The frequency characteristics of capacitor 14 is determined by the capacitor reactance whose magnitude is inversely proportional to frequency and the capacitance of the capacitor and, hence, the voltage thereacross is inversely proportional to the frequency and the capacitance. The voltage characteristic of resistor 15 which has a constant value of resistance has a voltage characteristic that increases with frequency due to the decrease of voltage across capacitor 14 due to its decrease in voltage thereacross upon increase of frequency.

Keeping the foregoing frequency characteristic for capacitor 14 and resistor 15 in mind and assuming that tank circuit 4 is tuned to the frequency above the input frequency, then, since circuit 4 is mechanically ganged with capacitor 14, capacitor 14 will have a capacitance which is too low. Therefore, the A.C. voltage applied to rectifier 16 will exceed that applied to rectifier 19. Hence, the cathode of rectifier 16 will be positive with respect to the cathode of rectifier 19 and accordingly a current will flow through a winding 35 of relay 33. Motor 45 then commences to increase the capacitance of capacitor 5 and 6 and the inductance of inductor 7. At the same time the value of the capacitance of capacitor 14 is accordingly increased. This readjustment continues until the output D.C. current from comparator 11 falls to a value at which fine comparator 22 takes over control.

In the case where tank circuit 4 is tuned to a frequency below the input frequency the capacitance of capacitor 14 will be too large. The cathode of rectifier 19 is now positive with respect to the cathode of rectifier 16 and the D.C. current flows in winding 35 in the opposite direction to that in the case described hereinabove. Hence, motor 45 will turn in the opposite direction and will cause the capacitance of capacitor 5 and 6 and the inductance of inductor 7 to decrease in value. At the same time the value of the capacitance of capacitor 11 is accordingly decreased. As before, this readjustment continues until the output D.C. current from comparator 11 falls to a value at which fine comparator 22 takes over control.

A second embodiment of the invention in a radio transmitter will now be described with reference to FIG. 3 of the accompanying drawings which shows an output tube 103 having a tank circuit indicated by rectangle 104.

A variable coupling inductor 110 couples tank circuit 104 to a transmitter aerial (not shown) which is connected across terminals 108 and 109, via a length of coaxial transmission line 120. An input drive signal to the control grid of tube 103 is applied across terminals 101 and 102. The D.C. supply connections to tube 103 are not shown.

The input signal is also connected to a coarse comparator 111 and a level detector circuit 112, coarse comparator 111 and level detector 112 being similar to the corresponding arrangements shown in FIG. 1.

A relay 133, such as a polar relay, is provided with two field windings 134 and 135, two fixed contacts 133A and 133B and a moving contact 133C. A D.C. supply 137 is connected across the fixed contacts 133A and 133B. The relay 133 and D.C. supply 137 form an actuator control circuit 132. The armature of D.C. motor 145 is connected to the moving contact 133C and to the center point of D.C. supply 137.

A fine comparator 122 includes a capacitor 150, a choke coil 151 connected in parallel with the capacitor 150, a rectifier 152, capacitor 150 being connected between the negative-going terminal of rectifier 152 and ground, and a load resistor 153 connected between the positive-going terminal of rectifier 152 and ground. The live terminal of resistor 153 is connected to one terminal of winding 134 of relay 133. A capacitor 154 is connected between the anode of tube 103 and the live terminal of capacitor 150.

The fine comparator 122 also includes a ring-shaped core 155 of ferromagnetic material having a secondary winding 156 wound thereon. The two ends of secondary winding 156 are each connected to a respective one of two rectifiers 157 and 158, both rectifiers being connected the same way round. Two load resistors 159 and 161 are connected each across opposite halves of secondary winding 156. The terminals of rectifiers 157 and 158 remote from secondary winding 156 are connected to decoupling capacitors 162 and 163, one terminal of each of these capacitors being connected to ground.

The junction point of rectifier 157, capacitor 162 and resistor 164 is connected to the second terminal of relay winding 134.

Two resistors 164 and 165 are connected in series between the live terminals of capacitors 162 and 163. A tapping point on resistor 165 is connected directly to ground. A choke coil 166 is connected between the junction of resistors 164 and 165 and the center tap of secondary winding 156. A conductor 167 connecting the variable inductor 110 with the coaxial transmission line 120 passes through the center of the circular area enclosed by core 155 and constitutes the primary conductor of a current transformer formed by conductor 167, core 155 and secondary winding 156.

Capacitors 168 and 169 are connected in series between conductor 167 and ground, the junction of the two capacitors being connected to the center tap of secondary winding 156.

The resistances of resistors 159 and 161 are made small in comparison with the magnitude of $\omega L$, where L is the inductance of secondary winding 156 and $\omega$ is equal to $2\pi \times$ the input signal frequency in cycles per second. The capacitors 168 and 169 form a capacitance potential divider from which a portion of the voltage V between conductor 167 (where it passes through ring-shaped core 155) and ground is applied to the center tap of winding 156. The relative capacitances of capacitors 168 and 169 are chosen so that the voltage applied to the center tap of winding 156 is equal to KV, where K is a constant numerically equal to $MR/L$, where M is the mutual inductance in henries between the conductor 167 and winding 156, and R is the resistance in ohms of resistor 159. The connections to winding 156 are arranged so that the voltage KV is in phase with the voltage produced by one-half of winding 156 across resistor 159. The resistances of resistors 159 and 161 are made equal and small compared with the magnitude of $\omega L$. The D.C. voltage developed across capacitor 162 is proportional to the square root of the power supplied to the aerial to within ±6% for standing wave ratios of up to 3:1 on conductor 167.

A drive shaft of motor 145 is coupled by mechanical coupling 150 to an adjustable tap on variable inductor 110 and also to a variable capacitor included in coarse comparator 111 and which performs the same function as variable capacitor 14 in coarse comparator 11 shown in FIG. 1.

The purpose of this embodiment of the invention is to adjust the coupling between the aerial and tank circuit 104 of the transmitter in accordance with the frequency of a drive signal applied to the control grid of tube 103 in order to reduce variations in the power supplied to the aerial. The coupling between the tank circuit and the antenna is varied by means of variable inductor 110. The tank circuit tuning can be performed automatically by the first embodiment of the invention, as already described.

When the setting of inductor 110 is well removed from the correct setting for the input signal frequency, the setting of the variable capacitor included in the coarse comparator 111, which is coupled to the inductor 110, will be such as to produce an output signal from the comparator which is of sufficient level to pass through the level detector and energize winding 135 of the relay 133. The D.C. motor 145 will then be operated and will adjust inductor 110 until the level of the output signal from comparator 111 becomes insufficient to pass through the level selector and relay winding 135 is no longer energized.

Comparator 111 is similar to comparator 11 of FIGURE 1 and operates in the same manner with the same frequency-voltage characteristics. The value of inductor 110 is required to be decreased as the input signal frequency increases and is required to be increased as the input signal frequency decreases. Therefore, if the inductance value of inductor 110 is above the correct value for the input signal frequency, the capacitance of capacitor 14 (comparator 11 of FIGURE 1) is accordingly too high in relation to the input signal frequency, and, since, the cathode of rectifier 19 becomes positive with respect to the cathode of rectifier 16. This results in motor 145 decreasing the inductance of inductor 110 and accordingly decreasing the capacitance of capacitor 14 until the fine comparator 122 takes over.

A similar but reverse procedure takes place when the inductance of inductor 110 is too low in relation to the incoming signal frequency resulting in motor 145 increasing the inductance of inductor 110 and accordingly increasing the capacitance of capacitor 14 until fine comparator 122 takes over.

The inductor 110 is now adjusted approximately correct and the fine comparator will take control of the operation of relay 133. A portion of the signal voltage at the anode of tube 103 is applied to rectifier 152 from the tapping of a potential divider formed by capacitors 154 and 150. The choke 151 provides a D.C. return path for the rectifier 152. A D.C. voltage is produced across the terminals of capacitor 150 which is in opposition to the D.C. voltage produced across capacitor 162. The direction of the current through winding 134 of the relay 133 and the resultant operation of moving contact 133C will therefore be dependent upon the relative magnitudes of the two D.C. voltages.

If the power supplied to the load repersented by the aerial and transmission line 120 is above the required value having regard to the signal voltage at the anode of tube 103 then motor 145 will alter the position of the tap on inductor 110 via mechanical coupling 150 in such a way as to increase the inductance of inductor 110, thus reducing the coupling between the tank circuit 104 and the aerial. If the power supplied to the load is below the required value then the inductance of inductor 110 will be correspondingly decreased.

It is necessary to render the coarse comparator inoperative once the fine comparator has taken control, because as in the first embodiment of the invention it is not possible to gang the coarse and fine comparators so that they both produce zero output at the same setting of the variable element.

In this embodiment of the invention a feedback path between the variable parameter (inductor 110) and coarse comparator 111 is provided by mechanical coupling 150, and a feedback path between the controlled element and the second comparator is provided by the inductive coupling between conductor 167 and winding 156, and the connection between the junction of capacitors 168 and 169 and the center tap of winding 156.

Other forms of control device, for example, a magnetic amplifier, could be used in place of relay 33 or relay 133.

The invention is not restricted to use in tuning control or aerial loading arrangements.

Although a motor is used as the actuator in both embodiments of the invention, in other applications of the invention the actuator could be an electronic device such as a reactance tube where, for instance, it is desired to vary the frequency of an oscillator in accordance with a parameter of the input signal.

In the embodiments which have been described the feedback signal to the fine comparator has been derived from the input signal, amplifier tube 3 or 103 forming a signal path from input terminals 1 and 2 to tank circuit 4 or 104.

The invention is also applicable to arrangements in which the signal feedback to the fine comparator from the variable parameter circuit is derived from a source other than the input signal. If for instance tube 3 were omitted, then FIG. 1 could represent an arrangement for locking the phase of a sine wave C.W. oscillator to an input signal, circuit 4 representing the main frequency determining circuit of the oscillator and terminals 8 and 9 the connections to an energizing source, such as a thermionic tube or a transistor.

A combined tuning and loading arrangement for a transmitter is formed if the tuning of tank circuit 104 of FIG. 3 is controlled independently by the arrangement shown in FIG. 1.

It is to be understood that the foregoing description of specific examples of this invention is not to be considered as a limitation on its scope.

What I claim is:
1. An electrical control arrangement comprising:
   a controlled element;
   an actuator coupled to said controlled element;
   a first path for a first input signal;
   a second path for a second input signal;
   a first circuit means coupled to said controlled element and said first path to produce a first error signal having an amplitude proportional to a first given indication of a misadjustment of said controlled element;
   a second circuit means coupled to said controlled element and said second path to produce a second error signal having an amplitude proportional to a second given indication of a misadjustment of said controlled element different than said first given indication;
   a level detector means coupled to said first path to produce a bias voltage having an amplitude proportional to the amplitude of said first input signal;
   a switching means coupled to said actuator to control the operation thereof in response to said first and second error signals;
   circuit element means having non-linear current-voltage characteristics coupled to the output of said level detector and biased by said bias voltage to establish a given threshold level;
   said circuit element means coupled to the output terminals of said first circuit means and said switching means to couple said first error signal to said switching means for control of said switching means by said first error signal when the amplitude of said first error signal is greater than said threshold level and to block the coupling of said first error signal to said switching means when the amplitude of said first error signal is less than said threshold level; and
   means coupling the output terminals of said second circuit means to said switching means to couple said second error signal thereto for control of said switching means only after the amplitude of said first error signal is less than said threshold level.

2. An arrangement according to claim 1, wherein said first circuit means includes
   a frequency comparator having a variable circuit component, and a mechanical coupling between said variable circuit component and said controlled element.

3. An arrangement according to claim 1, wherein said second circuit includes
   a phase comparator coupled to said second path and a terminal of said controlled element.

4. An arrangement according to claim 1 wherein said controlled element includes
   a variable circuit component coupled to said second path to couple an electrical signal related to said second input signal to a load circuit; and
said second circuit means includes
   a first means coupled to the output terminal of said variable circuit component to produce a first voltage proportional to the amplitude of said electrical signal at said output terminal,
   a second means coupled to the input of said variable circuit component to produce a second voltage proportional to the amplitude of said electrical signal at said input terminal, and
   a third means coupled to said first and second means to algebraically combine said first and second voltages to produce said second error signal.

5. An arrangement according to claim 1, wherein said controlled element includes
   at least one tuning component in a variable tuned circuit;
said first circuit means includes
   a frequency comparator having variable circuit component, and
   a mechanical coupling between said variable circuit component and said at least one tuning component; and said second circuit means includes
   a phase comparator coupled to said second path and a terminal of said variable tuned circuit.

6. An arrangement according to claim 1, wherein said controlled element includes
   a first variable circuit component coupled to said second path to couple an electrical signal related to said second input signal to a load circuit;

said first circuit means includes
   a freqency comparator having a second variable circuit component, and
   a mechanical coupling between said first variable circuit component and said second variable circuit component; and said second circuit means includes
   a first means coupled to the output terminal of said first variable circuit component to produce a first voltage having an amplitude proportional to the value of the power of said electrical signal at said output terminal,
   a second means coupled to the input terminal of said first variable circuit component to produce a second voltage having an amplitude proportional to the amplitude of said electrical signal at said input terminal, and
   a third means coupled to said first and second means to algebraically combine said first and second voltages to produce said second error signal.

7. An arrangement according to claim 1, wherein said first and second paths are coupled together and to said controlled element; and
said first input signal and said second input signal are identical.

8. An arrangement according to claim 7, wherein said controlled element includes
   at least one tuning component in a variable tuned circuit;

said first circuit means includes
   a frequency comparator having a variable circuit component, and
   a mechanical coupling between said variable circuit component and said at least one tuning component; and said second circuit means includes
   a phase comparator coupled to said second path and a terminal of said variable tuned circuit.

9. An arrangement according to claim 7, wherein said controlled element includes
   a first variable circuit component coupled to said second path to couple an electrical signal related to said second input signal to a load circuit;

said first circuit means includes
   a frequency comparator having a second variable circuit component, and
   a mechanical coupling between said first variable circuit component and said second variable circuit component; and said second circuit means includes
   a first means coupled to the output terminal of said first variable circuit component to produce a first voltage having an amplitude proportional to the value of the power of said electrical signal at said output terminal,
   a second means coupled to the input terminal of said first variable circuit component to produce a second voltage having an amplitude proportional to the amplitude of said electrical signal at said input terminal, and
   a third means coupled to said first and second means to algebraically combine said first and second voltages to produce said second error signal.

References Cited by the Examiner

UNITED STATES PATENTS

| | | | |
|---|---|---|---|
| 2,798,150 | 7/1956 | Tate et al. | 235—177 |
| 2,837,650 | 6/1958 | Keen et al. | 331—35 |
| 2,838,673 | 6/1958 | Fernsler et al. | 331—11 |

DAVID G. REDINBAUGH, *Primary Examiner.*

B. V. SAFOUREK, *Assistant Examiner.*